(12) United States Patent
Kori

(10) Patent No.: US 6,819,765 B1
(45) Date of Patent: Nov. 16, 2004

(54) VIDEO-SIGNAL OUTPUT APPARATUS, VIDEO-SIGNAL INPUT APPARATUS, AND SCRAMBLE METHOD, AND DESCRAMBLE METHOD

(75) Inventor: Teruhiko Kori, Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/569,287

(22) Filed: May 11, 2000

(30) Foreign Application Priority Data

May 14, 1999 (JP) ......................................... P11-134423

(51) Int. Cl.[7] .............................................. H04N 7/167
(52) U.S. Cl. ...................... 380/203; 380/201; 380/204; 380/205; 380/210; 380/226; 380/239; 713/165; 713/194; 713/200
(58) Field of Search .......................... 380/201, 203–205, 380/210, 226, 239; 713/165, 194, 200

(56) References Cited

U.S. PATENT DOCUMENTS

| | | | |
|---|---|---|---|
| 5,161,187 A | | 11/1992 | Kajita et al. |
| 5,394,470 A | * | 2/1995 | Buynak et al. ............. 380/204 |
| 5,418,853 A | * | 5/1995 | Kanota et al. ............. 380/203 |
| 5,627,655 A | | 5/1997 | Okamoto et al. |
| 5,778,064 A | * | 7/1998 | Kori et al. .................. 380/203 |
| 5,802,311 A | * | 9/1998 | Wronski ..................... 709/236 |
| 6,035,094 A | * | 3/2000 | Kori ............................ 386/94 |
| 6,678,465 B1 | * | 1/2004 | Swan .......................... 386/94 |

FOREIGN PATENT DOCUMENTS

| | | | | |
|---|---|---|---|---|
| EP | 0735752 A2 | * | 3/1996 | .......... H04N/5/913 |
| EP | 0 830 024 A2 | | 3/1998 | |
| EP | 0838949 A2 | * | 4/1998 | .......... H04N/7/025 |

OTHER PUBLICATIONS

Spicer et al, Use of the Vertical Blanking Interval on BBC Distribution, 1994, IEEE, pp. 2/1–2/4.*
Barr, David, Corpy Protection for High–Definition Baseband Video, 2000, IEEE, pp. 174–177.*
Lake, Matt, Tweaking Technology to Stay Ahead of the Film Pirates, 2001, New York Times, p. G.9.*
Zhang et al, A Flexibile Content Protection System for Media–on–Demand, 2002, IEEE, pp. 272–277.*

* cited by examiner

Primary Examiner—Emmanuel L. Moise
Assistant Examiner—Aravind Moorthy
(74) Attorney, Agent, or Firm—Lerner, David, Littenberg, Krumholz & Mentlik, LLP

(57) ABSTRACT

A system, which includes a video-signal output apparatus and a video-signal input apparatus, has a construction in which scrambling or descrambling is performed with a scramble key generated using copy-control information. If the copy-control information has been falsified, a scramble key for a scrambling mode will not coincide with a scramble key for a descrambling mode, whereby appropriate descrambling is not performed. By performing no scrambling in a vertical blanking interval, the copy-control information can be easily detected from a scrambled video signal.

10 Claims, 6 Drawing Sheets

VIDEO-SIGNAL OUTPUT APPARATUS, VIDEO-SIGNAL INPUT APPARATUS, AND SCRAMBLE METHOD, AND DESCRAMBLE METHOD

BACKGROUND OF THE INVENTION

1. Field of the Invention

The present invention relates to a video-signal output apparatus having a function of scrambling a video signal and outputting the signal, a video-signal input apparatus having a function of descrambling an input scrambled video signal, a scrambling method for the output apparatus, and a descrambling method for the input apparatus.

2. Description of the Related Art

In many cases, video software, such as movies, is prohibited from being copied beyond private use in accordance with copyright law. To protect the copyright of the video software, copy-control information is often superimposed at a predetermined position in a video signal in the video software.

Regarding a position at which the copy-control information should be inserted, the copy-control information is, in general, inserted in, for example, a predetermined horizontal scanning interval in a vertical blanking interval.

The value of the copy-control information indicates that the video software may be copied freely, is permitted to be copied to only one generation, or is prohibited from being copied.

Assuming that a video signal from a video source in which copy-control information indicating permission for only-one-generation copying is superimposed on the signal, is recorded (copied) on a recording medium by a recording apparatus, the recording apparatus performs recording after rewriting the copy-control information from a value indicating permission for only-one-generation copying to a value indicating prohibition of copying.

By way of example, when the recording medium that contains the copy-prohibited video source is read and copied, the recording apparatus detects the copy-control information, superimposed on the video signal, which indicates prohibition of copying, and operates so as not to perform recording on the recording medium. In other words, the use of the copy-control information prevents an unauthorized act of copying.

In actuality, it is always possible that the above-described copy-control information may be falsified by an unscrupulous person.

By way of example, by providing an apparatus that eliminates or modifies copy-control information so as to indicate that is "copy freely" or "permission for only-one-generation copying" between an output apparatus for outputting a video signal from a video source and a recording apparatus for recording an input video signal, the video source can be copied without limit.

Technology for falsifying the copy-control information is very easily realized since the copy-control information is simply a superimposed signal in a vertical blanking interval of the video signal.

In addition, in a recording apparatus for recording an input video signal from a video source, by only detecting the condition (waveform) of the input video signal, it is difficult to determine whether the copy-control information has been actually falsified, since superimposition of the copy-control information is a simple technique.

SUMMARY OF THE INVENTION

Accordingly, it is an object of the present invention to provide a video-signal output apparatus, a video-signal input apparatus, a scramble apparatus, and a descramble apparatus which protect the copyrights of video sources, even for cases where copy-control information has been intentionally falsified.

To this end, according to an aspect of the present invention, the foregoing object is achieved through provision of a video-signal output apparatus including: a signal-scrambling unit for scrambling, in accordance with a predetermined method, video signals on which copy-control information is superimposed at a predetermined position in a vertical blanking interval, and for performing scramble processing for one field or one frame interval so that the signal-scrambling unit performs scramble processing for at least an effective screen interval and that the signal-scrambling unit performs no scramble processing at a position at which at least the copy-control information is superimposed in the vertical blanking interval; and an output unit for outputting video signals processed by the signal-scrambling unit to the exterior.

According to another aspect of the present invention, the foregoing object is achieved through provision of a video-signal output apparatus including: a copy-control-information detecting unit for detecting copy-control information superimposed on a video signal at a predetermined position in a vertical blanking interval; a scramble-key generating unit for generating a scramble key by using the copy-control information detected by the copy-control-information detecting unit; a signal-scrambling unit for scrambling the video signal, based on the scramble key generated by the scramble-key generating unit in accordance with a predetermined method; and an output unit for outputting the video signal processed by the signal-scrambling unit to the exterior.

Preferably, the signal-scrambling unit performs scramble processing for one field or one frame interval so that the signal-scrambling unit performs scramble processing for at least an effective screen interval and that the signal-scrambling unit performs no scramble processing at a position at which at least the copy-control information is superimposed in the vertical blanking interval.

The video-signal output apparatus may further include a reading unit for performing reading and outputting on a predetermined recording medium on which video signals are recorded in a predetermined recording method. The video signals, read by the reading unit, are input to the signal-scrambling unit.

The copy-control information to be used by the scramble-key generating unit may be copy-control information superimposed on the video signals read and output by the reading unit, which are detected by the copy-control-information detecting unit.

According to a further aspect of the present invention, the foregoing object is achieved through provision of a video-signal input apparatus to which video signals are input and in which part of the video signals in an effective screen interval in at least one field or one frame interval is scrambled and in which part of the video signals in the interval of copy-control information at least superimposed at a predetermined position in a vertical blanking interval is not scrambled. The video-signal input apparatus includes a copy-control-information detecting unit for detecting the copy-control information, a scramble-key reproducing unit for reproducing a scramble key by using the copy-control information detected by the copy-control-information detecting unit; and a signal-descrambling unit for descrambling the input video signals, based on the scramble key reproduced by the scramble-key reproducing unit in accordance with a predetermined method.

Preferably, the video-signal input apparatus further includes a recording unit for recording the video signals processed by the signal-descrambling unit on a predetermined recording medium in accordance with a predetermined recording method.

According to a still further aspect of the present invention, the foregoing object is achieved through provision of a scramble method for scrambling, in accordance with a predetermined method, video signals on which copy-control information is superimposed at a predetermined position in a vertical blanking interval, and for performing scramble processing for one field or one frame interval so that the signal-scrambling unit performs scramble processing for at least an effective screen interval and that the signal-scrambling unit performs no scramble processing at a position at which at least the copy-control information is superimposed in the vertical blanking interval.

According to a further aspect of the present invention, the foregoing object is achieved through provision of a descramble method for descrambling video signals in which part of said video signals in an effective screen interval in at least one field or one frame interval is scrambled and in which part of said video signals in the interval of copy-control information at least superimposed at a predetermined position in a vertical blanking interval is not scrambled. The descramble method executes: a copy-control-information detecting process for detecting the copy-control information from the input video signal; a scramble-key reproducing process for reproducing a scramble key by using the copy-control information detected by the copy-control-information detecting process; and a signal-descramble process for descrambling the input video signal, based on the scramble key reproduced by the scramble-key reproducing process in accordance with a predetermined method.

According to a more aspect of the present invention, the foregoing object is achieved through provision of a descramble method for descrambling video signals in which part of said video signals in an effective screen interval in at least one field or one frame interval is scrambled and in which part of said video signals in the interval of copy-control information at least superimposed at a predetermined position in a vertical blanking interval is not scrambled. The descramble method executes: a copy-control-information detecting process for detecting the copy-control information from the input video signal; a scramble-key reproducing process for reproducing a scramble key by using the copy-control information detected by the copy-control-information detecting process; and a signal-descramble process for descrambling the input video signal, based on the scramble key reproduced by the scramble-key reproducing process in accordance with a predetermined method.

According to the present invention, in order to limit copying for the purpose of, for example, protection of copyright, scrambling or descrambling is performed based on a scramble key generated using copy-control information. Therefore, if the copy-control information has been falsified, a scramble key for scrambling does not coincide with a scramble key for descrambling, so that appropriate descrambling is not performed. In other words, an appropriately scramble-processed picture cannot be obtained for cases where the copy-control information is falsified, whereby strong prevention of falsification is achieved. By determining whether appropriate descrambling has been performed, detection of falsification is facilitated. When video signals are recorded or read using an inappropriate apparatus is not adapted for scrambling and descrambling functions in the present invention, an apparatus to which the video signals are input obtains an unclear picture. In this respect, protection of copying is enhanced.

According to the present invention, by performing scramble processing so that scrambling is performed in an effective screen interval in one field (frame) interval and that copy-control information inserted in a vertical blanking interval is not scrambled, the copy-control information can be easily detected regardless of whether the video signals have been descrambled. This can simplify a construction for a scrambling process according to the present invention, which is correlated with copy-control information.

DESCRIPTION OF THE PREFERRED EMBODIMENTS

Figure 1:
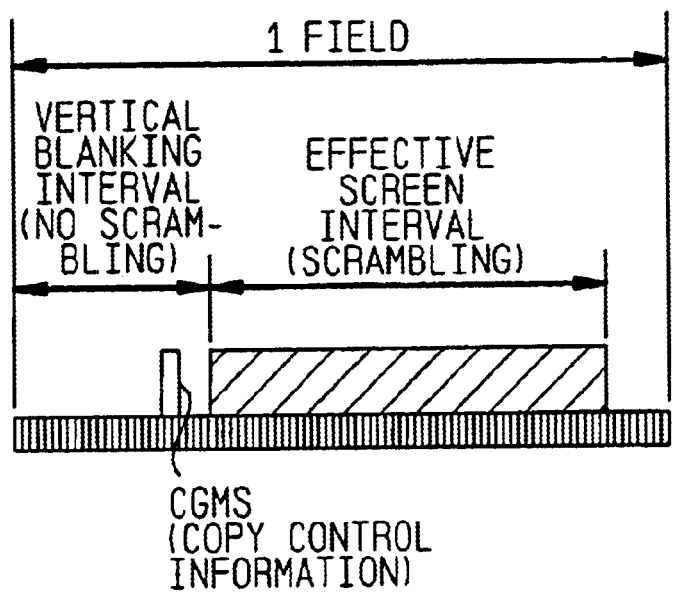
FIG. 1 is a waveform chart showing a video signal in a field which indicates a scramble method and a form of inserting copy-control information in an embodiment of the present invention.

Embodiments of the present invention are described below in the following order:
1. Concepts in Copy-Control Information and Scrambling in Embodiments;
2. Basic Structures of Video-Signal Output Apparatus and Video-Signal Input Apparatus; and
3. Actual Example of Copy Protection.
1. Concepts in Copy-Control Information and Scrambling in the Embodiments FIG. 1 shows one field interval of a video signal. In this one field interval of the video signal, a vertical blanking interval is firstly provided and an effective screen interval which has video signal components of an effective screen is successively provided, as is widely known.

Copy-control information is inserted in the vertical blanking interval so as to be superimposed. In this embodiment, a signal in accordance with a system called the "Copy Generation Management System for Analog Signal (CGMS-A) is used as copy-control information. In this Specification, the copy-control information in accordance with the CGMS-A is referred to as the "CGMS".

Figure 2:
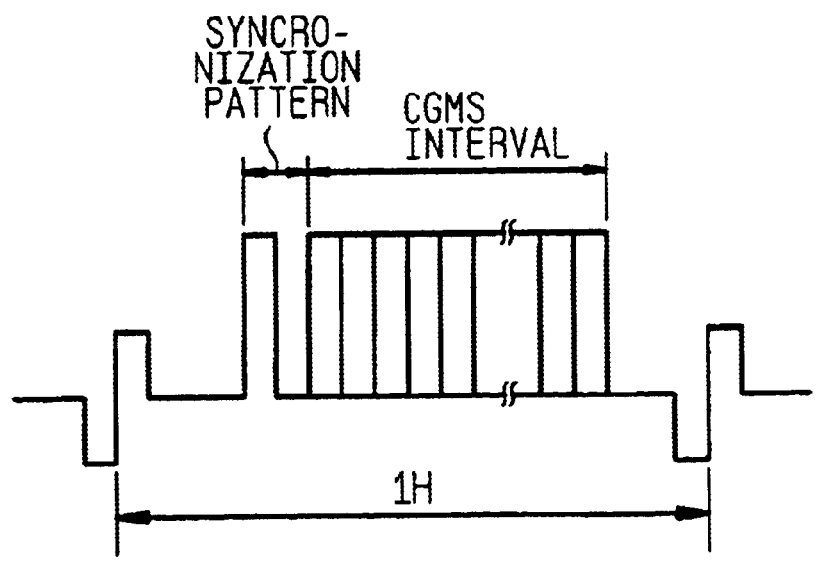
FIG. 2 is a waveform chart showing a video signal in a horizontal interval which indicates a form of inserting copy-control information.

The position at which the CGMS is inserted in the vertical blanking interval, which is shown in FIG. 1, is shown enlarged in FIG. 2.

FIG. 2 shows one predetermined horizontal scanning interval in the vertical blanking interval. As shown in FIG. 2, a synchronization pattern is firstly provided, and a waveform as the CGMS, which varies with actual data, is secondly provided.

Here, the CGMS is defined as follows:

| CGMS | Definition |
|---|---|
| 00 | Copy freely |
| 01 | One-generation copying possible |
| 11 | Copying prohibited |

The CGMS is, for example, 2-bit information. When the two bits are noon, the information represents "copy freely", which means that the number of copies is not limited.

When the CGMS is "01", the information indicates that only-one-generation copy is possible. When the CGMS is "11", the information represents prohibition of copying.

Referring back to FIG. 1, in a scramble method according to an embodiment of the present invention, scrambling is performed corresponding to an effective screen interval. In the vertical blanking interval, no scrambling is performed.

This is a preparation for easily detecting the CGMS with arbitrary timing without performing descrambling, after at least the CGMS inserted in the vertical blanking interval is not scrambled.

In practice, there is no particular limitation in superimposition of the CGMS on which of horizontal scanning intervals in the vertical blanking interval. The superimposition may be in accordance with an actually defined standard or the like.

Figure 3:
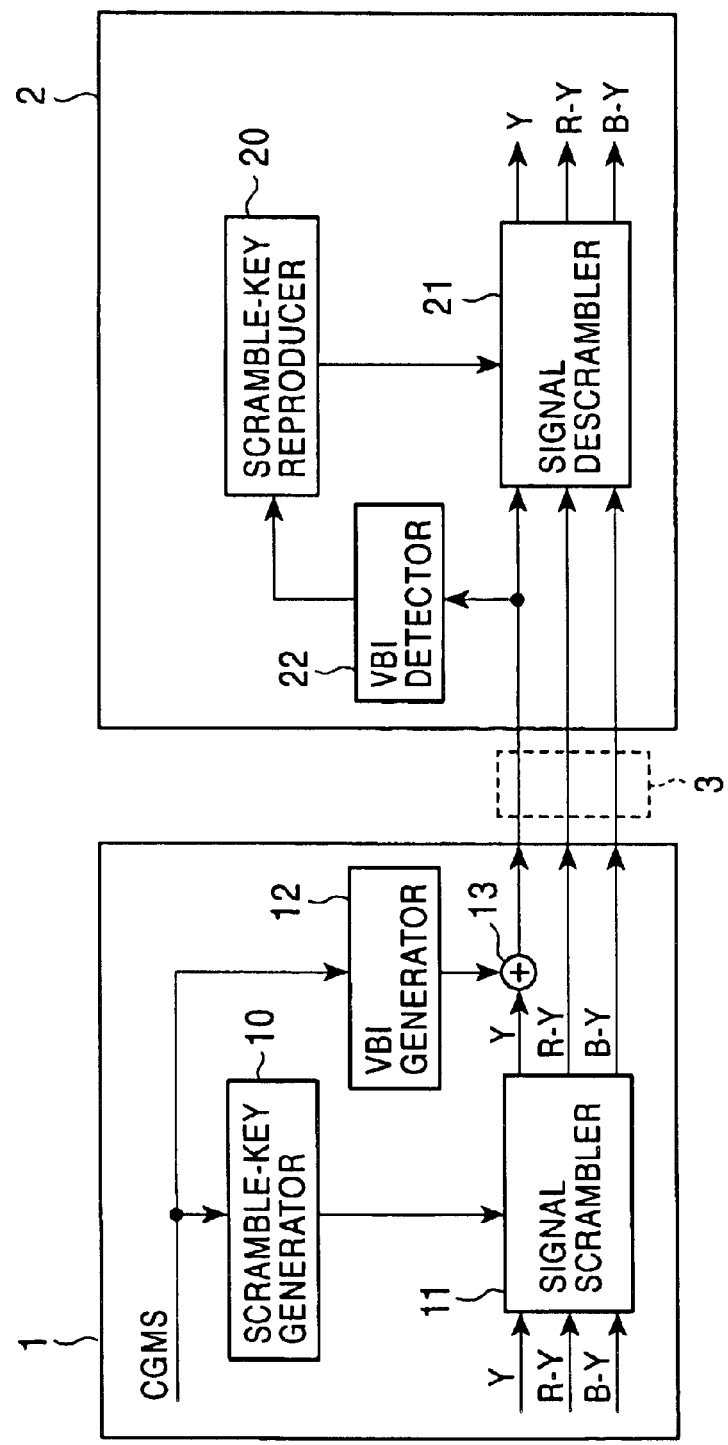
FIG. 3 is a block diagram showing an output apparatus and an input apparatus according to an embodiment of the present invention.

2. Basic Structures of Video-Signal Output Apparatus and Video-Signal Input Apparatus FIG. 3 shows conceptual basic structures of a video-signal output apparatus 1 and a video-signal input apparatus 2 according to embodiments of the present invention, which comply with the scramble method.

The output apparatus 1, shown in FIG. 3, may be one of various apparatuses such as videocassette recorders or the like, television broadcast tuners, and television receivers, as described below. Similarly, the input apparatus 2 may be one of various apparatuses such as videocassette recorders and display units (monitors). In FIG. 3 only a processing system for the CGMS, and signal scramble and descramble processing systems, are extracted and shown.

The output apparatus 1 adapted for the scramble method treats component video signals in analog form (hereinafter referred to as "analog component signals").

Accordingly, analog component signals, for example, a luminance (Y) signal, a color-difference (R-Y) signal, and a color-difference (B-Y) signal, are input to a signal scrambler 11 for performing scrambling.

The signal scrambler 11 generates scramble patterns based on a scramble key generated by a scramble-key generator, scrambles the analog component signals input in accordance with a predetermined scramble method, and outputs the scrambled signals via three signal lines corresponding to the Y signal, the R-Y signal, and the B-Y signal.

Here, the Y signal is output to the exterior via a combining unit 13 (described later), and the R-Y signal and the B-Y signal are output to the exterior.

As described above with reference to FIG. 1, the signal scrambler 11 executes signal processing so that scrambling in only the effective screen interval is executed without performing scrambling in the vertical blanking interval. This type of operation can be easily achieved by providing, for example, a counter, or the like, which counts horizontal scanning intervals in one field interval.

The CGMS, which should be set corresponding to a video source (video signals) output from the output apparatus 1, is input to the scramble-key generator 10, and the scramble-arm key generator 10 uses the input CGMS to generate a scramble key.

By way of example, a scramble key to be used for performing actual scrambling is represented by the following expression:

$$Sk=f(Sk, CGFMS)$$

where Sk represents a scramble key, and f represents a function having a predetermined computational expression for generating the scramble key. The scramble-key generator 10 generates the scramble key by performing computation represented by the expression. This means that the scramble key is determined so as to be correlated with the copy-control information.

In the output apparatus 1, a vertical blanking interval (VBI) generator 12 is provided.

When, for example, CGMS data is input to the VBI generator 12, the VBI generator 12 generates a video-signal waveform in the vertical blanking interval, in which the CGMS waveform is superimposed in the predetermined one horizontal scanning interval, as described with reference to FIG. 2. This video-signal waveform is output to the combining unit 13 with timing that the Y signal output from the signal scrambler 11 is used as a vertical blanking interval.

The combining unit 13 combines the video-signal waveform in the vertical blanking interval, which is input from the VBI generator 12, with the vertical blanking interval of the Y signal input from the signal scrambler 11.

As a result, the analog component signals, output from the output apparatus 1, are in a scrambled state, as described with reference to FIG. 1.

The input apparatus 2, shown in FIG. 3, includes a VBI detector 22, a scramble-key reproducer 20, and a signal descrambler 21, which are formally adapted for the scramble method according to the embodiment.

The analog component signals input to the input apparatus 2 are input to the signal descrambler 21. Among the input analog component signals, the Y signal is split and input to the VBI detector 22.

The VBI detector 22 detects the waveform of the vertical blanking interval of the input Y signal, whereby the CGMS, superimposed on the Y signal when it is sent from the output apparatus 1, is detected and obtained as data. The CGMS data is supplied to the scramble-key reproducer 20. The scramble-key reproducer 20 uses the input CGMS to perform computation using a function similar to the above-described expression, thereby reproducing and outputting the scramble key to the signal descrambler 21.

The signal descrambler 21 executes descrambling on the analog component signals in accordance with descramble patterns obtained based on the input scramble key, and outputs the descrambled signals to a predetermined function circuit unit (not shown).

At this stage, if the CGMS superimposed in the vertical blanking interval of the video signal has not been falsified until the analog component signals are input from the output apparatus 1 to the input apparatus 2, the value of the CGMS which is used for generating the scramble key by the output apparatus 1 must be equal to the value of the CGMS which is used for reproducing the scramble key by the output apparatus 1. Thus, the scramble key generated by the output apparatus 1 and the scramble key reproduced by the input apparatus 2 must be the same. Accordingly, the output apparatus 1 and the input apparatus 2 use a common scramble key, whereby the input apparatus 2 can obtain appropriately descrambled video signals.

Conversely, in the case where the value of the CGMS, which is superimposed on the Y signal when it is sent from the output apparatus 1, differs from the value of the CGMS which is detected by the input apparatus 2 by inserting a falsifying unit 3 in the channels for the analog component signals between the output apparatus 1 and the input apparatus 2 so that the CGMS is falsified or deleted, the in scramble key generated by the output apparatus 1 and the scramble key detected by the input apparatus 2 do not have the same scramble key. Accordingly, even if descrambling is performed by the input apparatus 2, it is not appropriately executed, so that irregular video signals are obtained.

By way of example, it is assumed that CGMS "11" representing copy prohibition is superimposed on the Y signal in the output apparatus 1. It is also assumed that the Y signal is input to the input apparatus 2, with the CGMS falsified into CGMS "00" representing "copy freely".

In this case, the output apparatus 1 uses the CGMS "11" to generate a scramble key, and the input apparatus 2 uses the CGMS "00" to reproduce the scramble key. Accordingly, the scramble keys differ. As a result, the video-signal waveform cannot be appropriately reproduced, even if descrambling is performed in the input apparatus 2. This means that determination of whether the CGMS has been falsified is performed based on the descramble result.

Basically, in the present invention, by correlating the CGMS with the scramble key, as described above, copy control is performed in which appropriate descrambling cannot be performed if the CGMS has been falsified. In other words, this copes with falsification of the CGMS.

In the present invention, when the CGMS, set for the analog component signals processed by the output apparatus 1, is "00" representing "copy freely", the signals are output without being scrambled. Accordingly, also when the CGMS, inserted for the analog component signals input to the input apparatus 2, is detected as "00", descrambling is not performed.

3. Actual Examples of Copy Protection

With reference to FIGS. 4 to 7 copy control is described below, using actual examples. In FIGS. 4 to 7, blocks identical to those shown in FIG. 3 are denoted by identical reference numerals, and a description of their operations is omitted.

Figure 4:
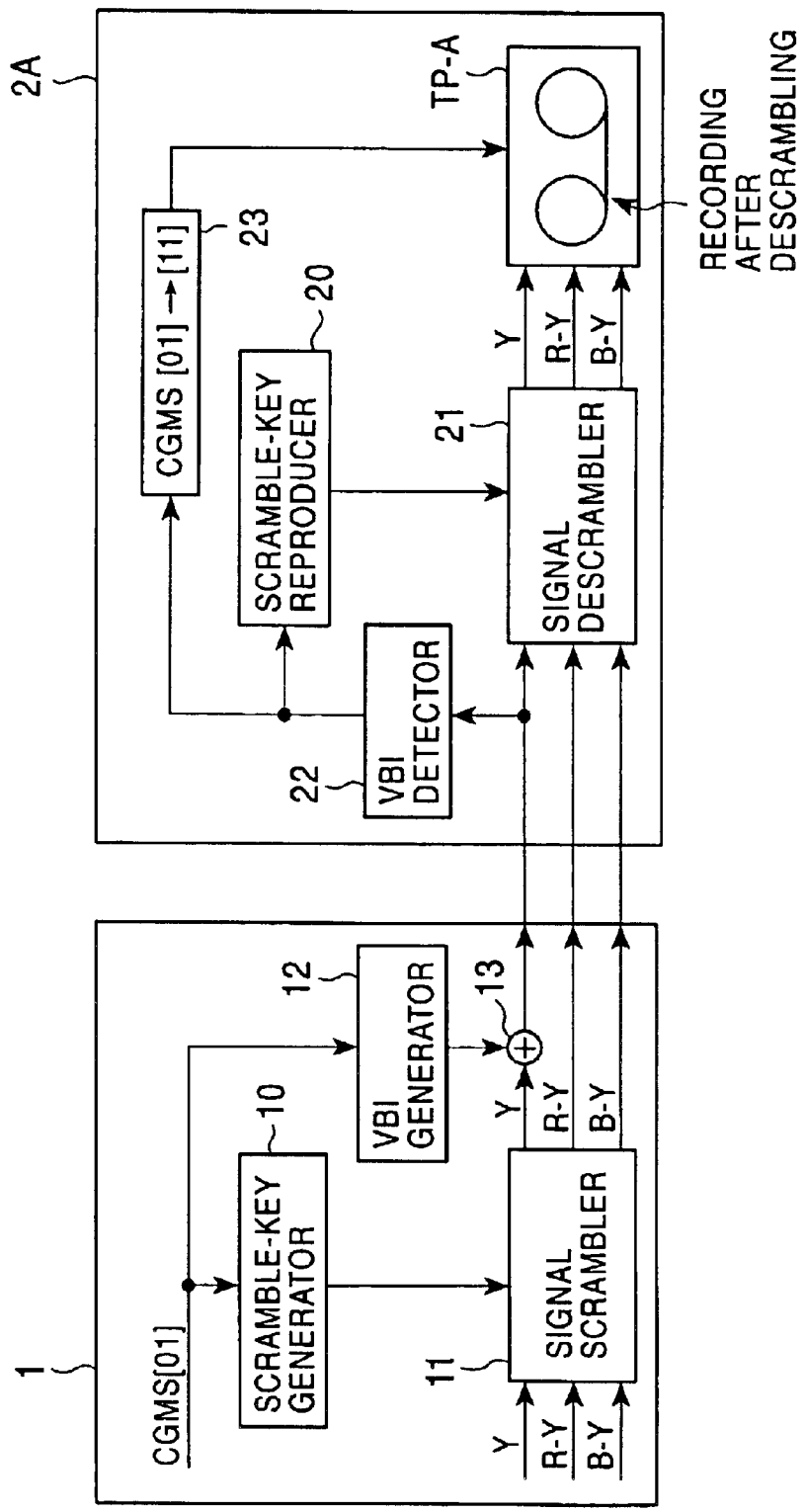
FIG. 4 is a block diagram showing an actual example of copy protection in an embodiment of the present invention, which indicates an example of connection between an output apparatus and an input apparatus.

FIG. 4 shows an output apparatus 1 as shown in FIG. 3, which is adapted for the scramble method, and a recording apparatus 2A (as an input apparatus) which records video signals on a magnetic tape.

The output apparatus 1 uses CGMS "01" to perform signal scrambling. Also, the output apparatus 1 superimposes CGMS "01" on a scrambled Y signal, and outputs the resultant signal.

The recording apparatus 2A reproduces the descramble key, as described referring to FIG. 3, and performs signal descrambling, thereby obtaining appropriately restored analog component signals. The recording apparatus 2A records the appropriately restored analog component signals on a magnetic tape.

At this time, the CGMS "01" superimposed in the output apparatus 1 is detected by a VBI detector 22 in the recording apparatus 2A, and is changed into "11" by a converter 23. In other words, in order that the video signals having permission of one-generation copy may be recorded on the tape, the CGMS is changed into "11" representing copy prohibition. Actually, the CGMS "11" is superimposed on the Y signal, and is recorded on the tape.

The following description also uses the tape containing the video signals that are descrambled (as described above) by the recording apparatus 2A in the construction shown in FIG. 4 and that include the CGMS "11". Accordingly, for convenience, the tape is denoted by "TP-A".

Next, the present invention is described below with reference to FIG. 5.

Figure 5:
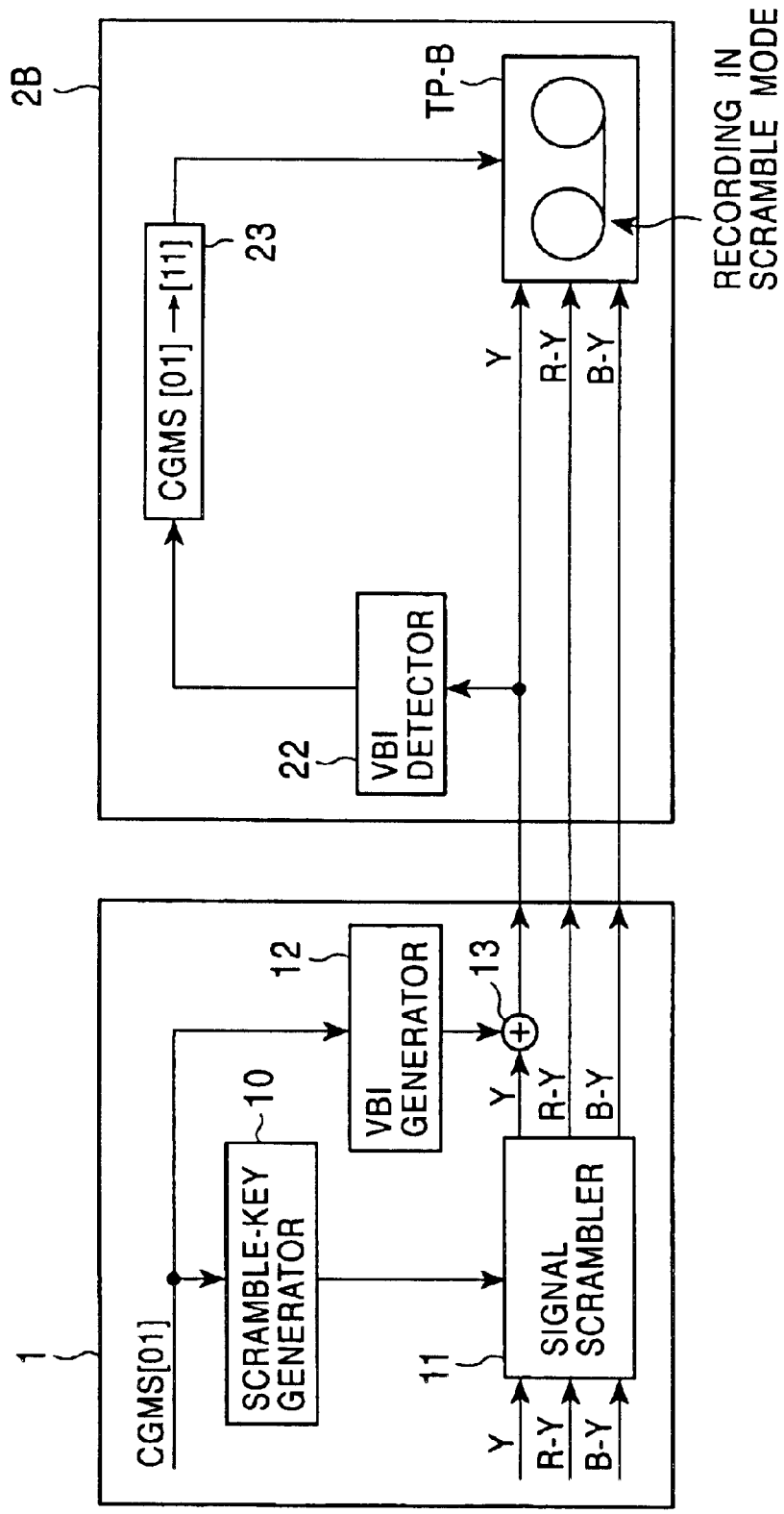
FIG. 5 is a block diagram showing an actual example of copy protection in an embodiment of the present invention, which indicates an example of connection between an output apparatus and an input apparatus.

FIG. 5 shows an output apparatus 1 as shown in FIG. 3, which is adapted for the scramble method of the present invention, and a recording apparatus 2B (as an input apparatus) which is not adapted for the scramble method of the present invention.

Although the recording apparatus 2B includes a VBI detector 22 and a converter 23, it does not include processing units corresponding to the scramble-key reproducer 20 and the signal descrambler 21 shown in FIG. 3 or 4.

Here, similarly to the construction shown in FIG. 4, it is assumed that the output apparatus 1 uses the CGMS "01" to perform signal scrambling. It is also assumed that the output apparatus 1 superimposes the CGMS "01" on a scrambled Y signal.

In this construction, without performing descrambling, the recording apparatus 2B records, on a magnetic tape, scrambled video signals which are input from the output apparatus 1 and on which the CGMS "01" is superimposed.

The above-described tape that contains the video signals which are not descrambled and on which the CGMS "01" is superimposed is denoted by "TP-B".

Figure 6:
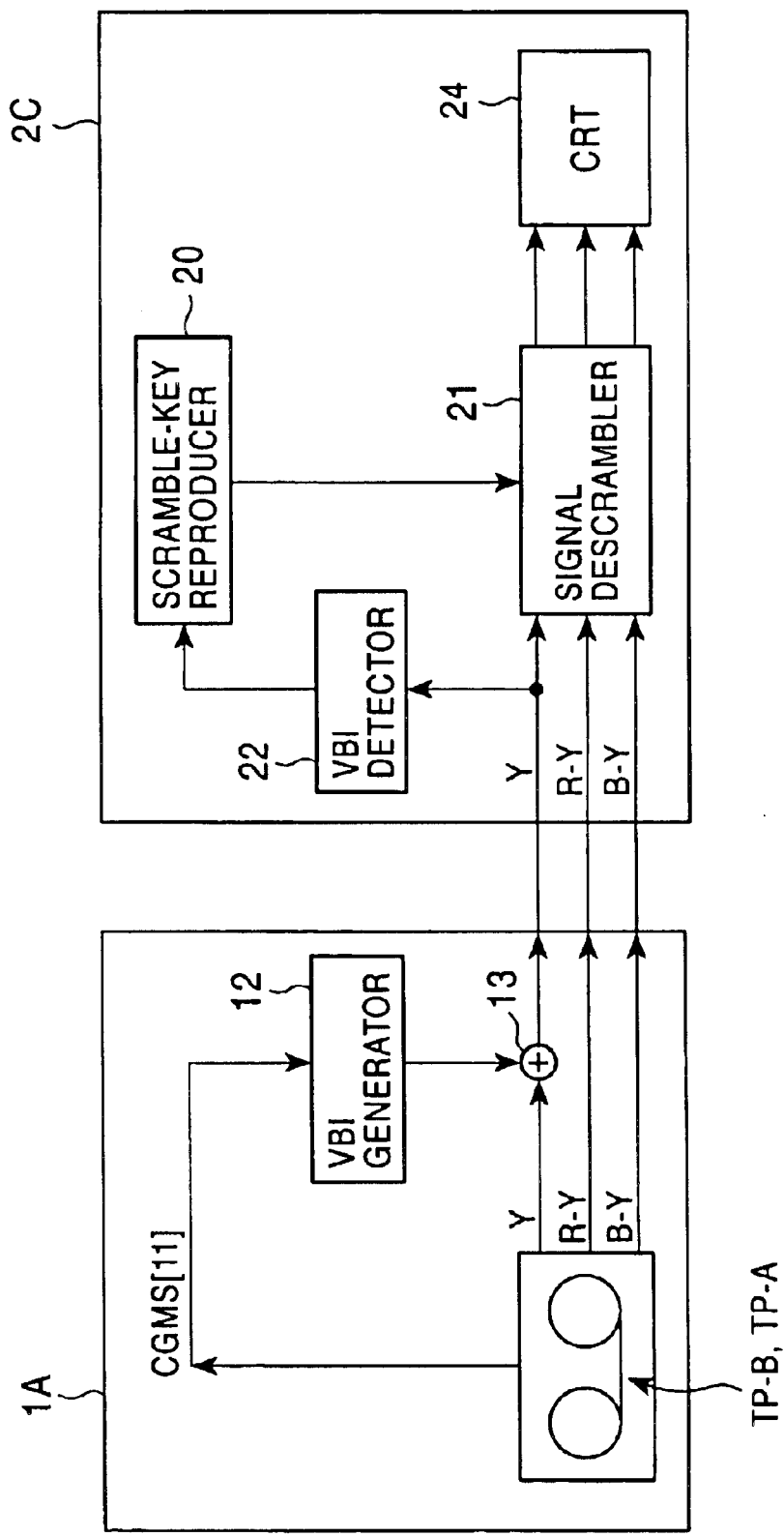
FIG. 6 is a block diagram showing an actual example of copy protection in an embodiment of the present invention, which indicates an example of connection between an output apparatus and an input apparatus.

FIG. 6 shows a construction in which a player apparatus 1A which is not adapted for the scramble method is used as an output apparatus and a display apparatus 2C adapted for the scramble method is used as an input apparatus.

The player apparatus 1A includes a VBI generator 12 in which when the CGMS superimposed in the Y signal of video signals recorded on a magnetic tape is, for example, "01", the VBI generator 12 changes the CGMS into "11" for superimposing the CGMS on the read Y signal and outputs it. The display apparatus 2C also includes a cathode-ray tube (CRT) 24 for displaying the video signals descrambled by a construction as in the above-described embodiments. Other than the CRT, the display apparatus 2C may be, for example, a liquid crystal device, etc. There is no particular limitation in the type of the display apparatus 2C.

It is assumed that the tape TP-B described referring to FIG. 5 is played by the player apparatus 1A in the above-described construction. In this case, video signals recorded on the tape TP-B remain scrambled, and the video signals, which includes the CGMS "11", are output to the display apparatus 2C.

Since a construction adapted for the scramble method in the above-described embodiments is employed in the display apparatus 2C, the display apparatus 2C descrambles the scrambled video signals. The video signals read from the tape TP-B are signals scrambled by a scramble key using the CGMS "11", as can be understood from the description using FIG. 5. The display apparatus 2C reproduces the scramble key, using the CGMS "11". Thus, appropriate descrambling is not performed. This means that as long as video signals are recorded on the tape TP-B by an apparatus which is not adapted for the scramble method in the above-described embodiments, it is impossible to perform the reading of the video signals, and descrambling by the input apparatus having a descramble function to restore the video signals.

If the tape TP-A described using FIG. 4 is played in the construction shown in FIG. 6, a scramble key reproduced using the CGMS "11" is used to scramble input video signals by the display apparatus 2C. Accordingly, appropriately video signals cannot be obtained from the tape TP-A, and a picture based on the video signals is not displayed in its original condition. In other words, to descramble unscrambled video signals is consequently the scrambling of the video signals.

This means that if a magnetic tape on which video signals are recorded after being scrambled and descrambled is played by an apparatus which is not adapted for the scramble method in the above-described embodiments, appropriate video signals cannot be obtained and that appropriate video signals can be obtained by, for example, only a display apparatus having no descramble function.

Figure 7:
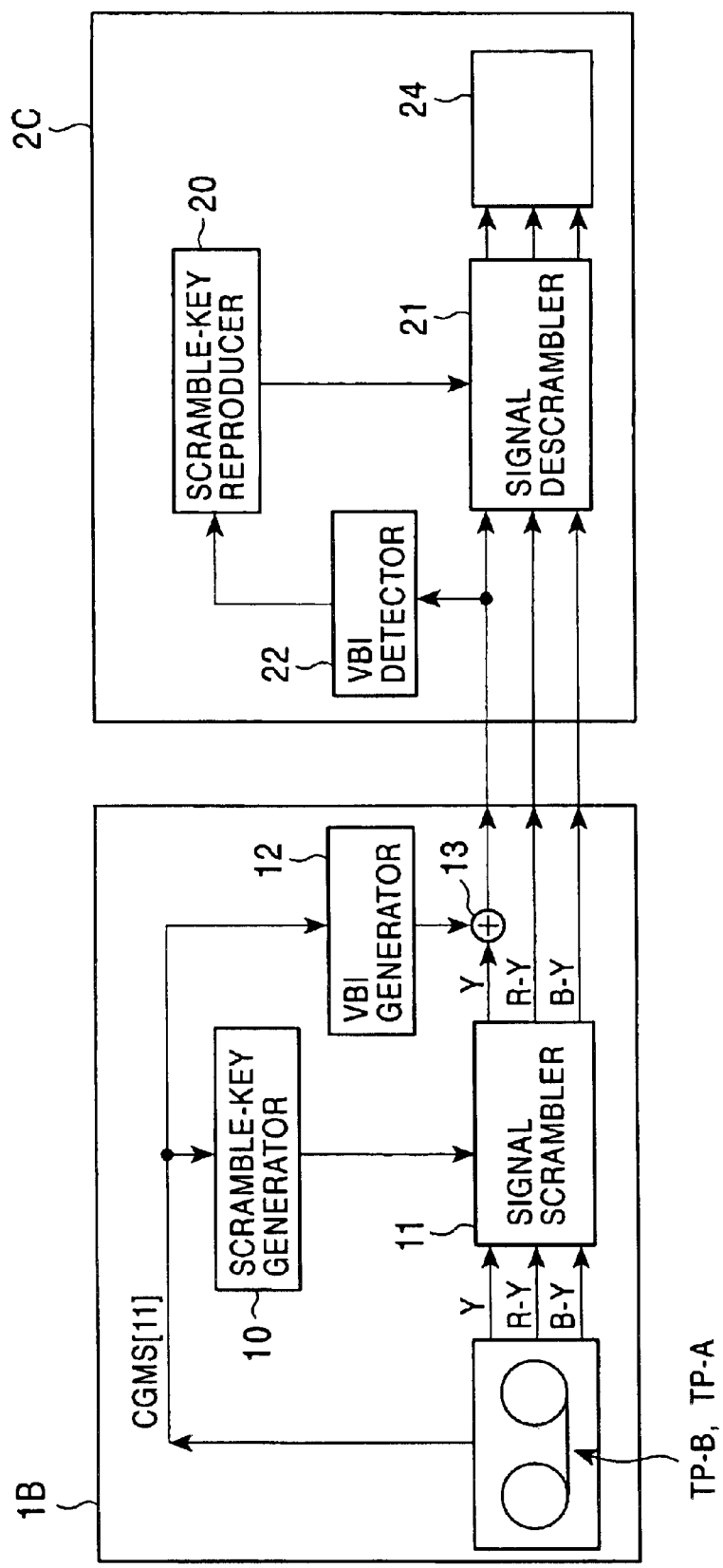
FIG. 7 is a block diagram showing an actual example of copy protection in an embodiment of the present invention, which indicates an example of connection between an output apparatus and an input apparatus.

FIG. 7 shows the case where a player apparatus 1B adapted for the scramble method in the above-described embodiment is used as an output apparatus and a display apparatus 2C is used as an input apparatus similarly to the case shown in FIG. 6. Blocks identical to those shown in FIG. 6 are denoted by identical reference numerals, for omitting descriptions.

The player apparatus 1B is designed to scramble video signals read from a magnetic tape. Similarly to the player apparatus 1A shown in FIG. 6, the player apparatus 1B has a function in which if the CGMS superimposed on the Y signal of video signals recorded on the tape is "01", the function changes it into "11" and uses a VBI generator 12 to perform superimposition of the CGMS "11" on the scrambled Y signal and outputting the signal.

When the player apparatus 1B plays, for example, the TP-A, video signals on the tape TP-A are scrambled by a scramble key using the CGMS "11", and the signals are output. In this case, the CGMS "11" is superimposed on the scrambled Y signal.

In this case, in the display apparatus 2C, the read video signals are descrambled by the scramble key reproduced using the CGMS "11", and the signals are output on the CRT 24. The player apparatus 1B and the display apparatus 2C obtain the same scramble key. Thus, in the display apparatus 2C, the video signals are appropriately descrambled and the restored picture is displayed.

When the tape TP-B is played by the player apparatus 1B in the construction shown in FIG. 7, the scrambled video signals recorded on the tape TP-B are scrambled with the scramble key generated using the CGMS "11" by the player 13 apparatus 1B because the video signals on the tape TP-B remains scrambled by the scramble key using the CGMS "00".

If the video signals output from the player apparatus 1B are descrambled with the scramble key reproduced using the same CGMS "11", the video signals simply return to earlier video signals scrambled with the CGMS "01", and an appropriate picture is not displayed. This means that video signals falsely recorded cannot be appropriately played and displayed in a system adapted for the scramble method in the above-described embodiments.

As can be understood from the foregoing description, in the present invention, a system in which the scramble method in the above-described embodiments cannot perform display depending on, for example, a display apparatus which is not adapted for the scramble method in the above-described embodiments. In other words, in this respect, it is possible to determine whether any false act has been performed.

In the following description, no illustration is used.

When in order that video signals which are scrambled with the scramble key generated using the CGMS "11" and are output may be recorded, the CGMS "11" is rewritten into "00" or "01", recording using correct video signals cannot be performed by, for example, a recording apparatus 2A (shown in FIG. 4), as can be clear from the description of the basic construction shown in FIG. 3.

In other words, if the CGMS is falsified into "00", the recording apparatus 2A does not execute descrambling by detecting the falsified CGMS "00" whereby video signals, which are unchanged in a scrambled form with the scramble key generated using the CGMS "11", are recorded.

When the CGMS is falsified into "01", video signals scrambled with the scramble key using the CGMS "11" are descrambled (for recording) with the scramble key reproduced using the CGMS "01", whereby the recorded video signals are not appropriately descrambled, which are irregular.

The relationships between CGMS values and actual scramble states, and determination results corresponding to the relationships are shown as a summary of the foregoing description in the following table.

| CGMS | Scramble State | Determination Result |
|---|---|---|
| 00 | Not scrambled | Copy freely |
| 01 | Scrambled with a key corresponding to "01" | One-generation copying possible |
| 11 | Scrambled with a key corresponding to "11" | Copying prohibited |
| 00, 01 | Scrambled with a key corresponding to "11" | CGMS "11" falsified into "00" or "01" |
| 11 | Scrambled with a key corresponding to "01" (on medium) | Recorded by an apparatus not adapted for scrambling |
| 11 | Unscrambled signal output | Read by an apparatus not adapted for scrambling |
| 11 | Scrambled so that descrambling is possible | Output from a medium containing contents recorded by an apparatus not adapted for scrambling |
| 01 | Scrambled with a key corresponding to "01" (on medium) | Recorded by an apparatus not adapted for CGMS |

In this table, the three upper lines correspond to cases where no falsification is performed, and the five lower lines correspond to cases where recording or playing is performed using apparatuses which are not adapted for the scramble/copying-protection method in the foregoing embodiments and where the CGMS is falsified.

In the forgoing embodiments, analog component signals are scrambled or descrambled. However, the type of signal to be processed may be a composite signal.

Definitely, a video-signal output apparatus and a video-signal input apparatus of the present invention are not limited to the foregoing illustrated embodiments, but may be applied to various types of apparatuses capable of processing video signals. By way of example, any type of video signal output apparatus and any type of video-signal input apparatus may be used, such as videocassette recorders (using a digital or analog recording method) which perform tape recording, and recording/playing apparatuses adapted for, for example, recordable disk media.

What is claimed is:

1. A video-signal output apparatus, comprising:

signal-scrambling means for scrambling video signals on which copying-control information is superimposed at a predetermined position in a vertical blanking interval, and for performing scramble processing as a function of the copy-control information for least an effective screen interval of one field or one frame interval and no scramble processing at the predetermined position; and output means for outputting video signals processed by said signal-scrambling means.

2. A video-signal output apparatus, comprising:

copying-control-information detecting means for detecting copying-control, information superimposed on a video signal at a predetermined position in a vertical blanking interval;

scramble-key generating means for generating a scramble key by using the copy-control information detected by said copy-control-information detecting means;

signal-scrambling means for scrambling the video signal based on the scramble key generated by said scramble-key generating means in accordance with a predetermined method; and output means for outputting the video signal scrambled by said signal-scrambling means.

3. A video-signal output apparatus according to claim 2, wherein said signal-scrambling means performs scramble processing for at least an effective screen interval of one field or one frame interval and no scramble processing at the predetermined, position.

4. A video-signal output apparatus according to claim 2, further comprising reading means for reading and outputting video signals from a predetermined recording medium, on the video signals read by said reading means being input to said signal-scrambling means.

5. A video-signal output apparatus according to claim 4, wherein the copy-control information detected by said copy-control information detecting means is copy-control information superimposed on the video signals read and output by said reading means.

6. A video-signal input apparatus to which video signals are input, a part of the video signals in an effective screen interval of at least one field or one frame interval being scrambled, and another part of the video signals having copy-control information superimposed thereon at a predetermined position in a vertical blanking interval being not scrambled, said video-signal input apparatus comprising:

copy-control-information detecting means for detecting the copy-control information;

scramble-key reproducing means for reproducing a scramble key by using the detected copy-control information; and signal-descrambling means for descrambling the input video signals based on the scramble key reproduced by said scramble-key reproducing means.

7. A video-signal input apparatus according to claim 6, further comprising a recording means for recording the video signals descrambled by said signal-descrambling means on a recording medium in accordance with a predetermined recording method.

8. A method for scrambling video signals comprising:

superimposing copy-control information at a predetermined position in a vertical blanking interval of a video signal, and performing scramble processing for one of an interval consisting of one field or one frame so that signal-scrambling processing of said video signal is performed, as a function of said copy-control information, for at least an effective screen interval and so that no signal scrambling processing is performed at a position at which at least said copy-control information is superimposed in said vertical blanking interval.

9. A scramble method, comprising:

detecting copy-control information superimposed at a predetermined position in a vertical blanking interval of a video signal;

generating a scramble key by using the detected copy-control information; and scrambling the video signal based on the generated scramble key.

10. A method for descrambling a scrambled input video signal, comprising:

detecting the copy-control information superimposed, and not scrambled, at a predetermined position in a vertical blanking interval of the input video signal;

reproducing a scramble key by using the detected copy-control information; and descramble process for descrambling the scrambled input video signal for at least one field or one frame of video based on the reproduced scramble key.

* * * * *

UNITED STATES PATENT AND TRADEMARK OFFICE
CERTIFICATE OF CORRECTION

PATENT NO. : 6,819,765 B1
DATED : November 16, 2004
INVENTOR(S) : Teruhiko Kori

It is certified that error appears in the above-identified patent and that said Letters Patent is hereby corrected as shown below:

Column 3,
Line 22, immediately following "the vertical blanking interval." insert the following as a new paragraph:
-- According to yet another aspect of the present invention, the foregoing object is achieved through provision of a scramble method for executing: a copy-control-information detecting process for detecting copy-control information superimposed at a predetermined position in a vertical blanking interval of a video signal; a scramble-key generating process for generating a scramble key by using the copy-control information detected by the copy-control-information detecting process; and a signal-scramble process for scrambling the video signal, based on the scramble key generated by the scramble-key generating process in accordance with a predetermined method. --

Column 3,
Delete lines 40-56.

Column 4,
Line 5, "apparatus is not" should read -- apparatus which is not --.

Column 5,
Line 22, "noon," should read -- 00, --.

Column 6,
Line 4, "FIG. 1" should read -- FIG. 3 --.
Line 14, "arm key" should read -- key --.
Line 18, "CGFMS" should read -- CGMS --.

Column 7,
Line 17, "deleted, the in" should read -- deleted, the --.

Column 8,
Line 56, "includes" should read -- include --.
Line 63, "11" should read -- 01 --.

UNITED STATES PATENT AND TRADEMARK OFFICE
CERTIFICATE OF CORRECTION

PATENT NO. : 6,819,765 B1
DATED : November 16, 2004
INVENTOR(S) : Teruhiko Kori

It is certified that error appears in the above-identified patent and that said Letters Patent is hereby corrected as shown below:

<u>Column 9,</u>
Line 53, "13 apparatus 1B" should read -- apparatus 1B --.
Line 55, "00" should read -- 01 --.

<u>Column 11,</u>
Line 14, "copying-control, information" should read -- copying-control information --.
Line 34, "medium, on" should read -- medium, --.

<u>Column 12,</u>
Lines 14-15, "medium in accordance with a predetermined recording method." should read -- medium. --.
Line 37, "detecting the copy-control" should read -- detecting copy-control --.

Signed and Sealed this

Twenty-ninth Day of March, 2005

JON W. DUDAS
*Director of the United States Patent and Trademark Office*